UNITED STATES PATENT OFFICE.

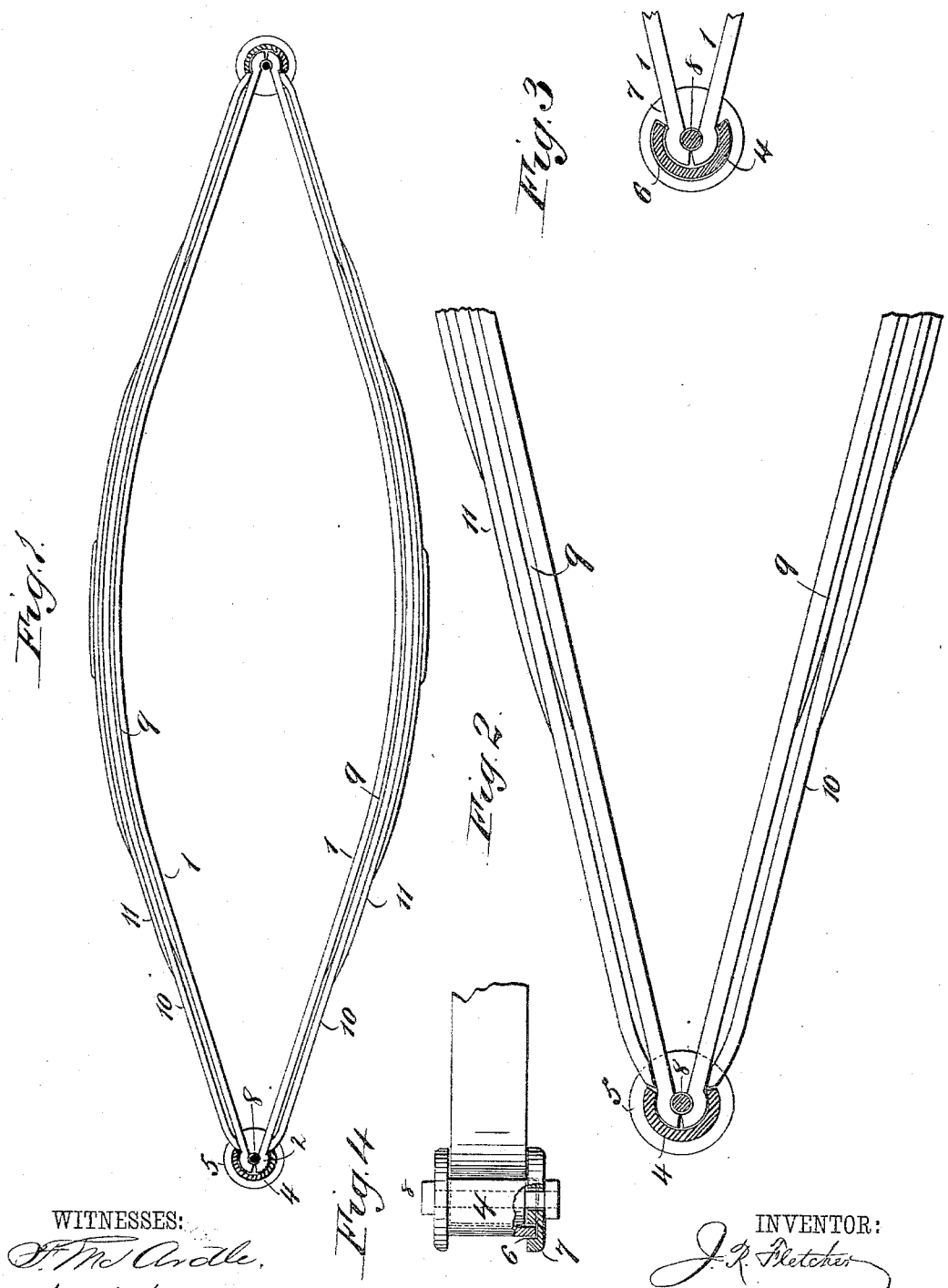

JAMES R. FLETCHER, OF CLARKSVILLE, IOWA.

ELLIPTIC SPRING.

SPECIFICATION forming part of Letters Patent No. 381,688, dated April 24, 1888.

Application filed February 20, 1888. Serial No. 264,640. (No model.)

*To all whom it may concern:*

Be it known that I, JAMES R. FLETCHER, of Jackson Township, (Clarksville P. O.,) in the county of Butler and State of Iowa, have invented a new and Improved Elliptic Spring, of which the following is a full, clear, and exact description.

This invention relates to vehicle-springs; and it consists, essentially, of inner and outer leaves, a means for connecting the ends of the inner leaves, and a means for spacing the leaves, all as will be hereinafter more fully described, and specifically pointed out in the claims.

Reference is to be had to the accompanying drawings, forming a part of this specification, in which similar figures of reference indicate corresponding parts in all the views.

Figure 1 is a side view of a spring constructed in accordance with the terms of my invention, the spring-socket being shown in section. Fig. 2 is an enlarged view of one end of the spring, the socket being shown in section. Fig. 3 is a detail view of the socket, taken from a point opposite to that from which the view in Fig. 2 is taken; and Fig. 4 is a plan view of the socket, parts being broken away.

In constructing such a spring as the one illustrated in the drawings above referred to, I provide inner plates, 1 1, the ends of which are bent to approximately semicircular form, as shown at 2, in order that the adjacent ends of the upper and lower plates of an elliptic spring may be placed to fit snugly within a circular tube-like flange, 4, which is made integral with a disk, 5, the extending end of the tube-like flange fitting within a recess, 6, that is formed in a disk, 7, the disks 5 and 7 being held together by a bolt, 8, which passes between the curved ends 2 of the plates 1.

Upon the outer faces of the plates 1, I place spacing-leaves 9, which are proportioned substantially as represented in the drawings, and upon the outer faces of these spacing-leaves 9, I place other plates, 10, the ends of which are bent downward, so as to bear against the outer faces of the plates 1, in close proximity to the ends of the flanges 4, and suitable or proper strengthening or stiffening leaves, 11, may be arranged outside of the plates 10, as illustrated.

It will be noticed that the leaves 9 and 11 are thinner than the plates 1 and 10, this proportion being adopted in order that the tension of the said leaves 9 and 11 upon their plates may be reduced to the least quantity compatible with the other conditions essential to the proper operation of this form of spring. It will also be noticed that the plates 1 and 10 are parallel, this construction being adopted in order that each plate may bear an equal share of strain, and that the plates 10 are separated from the plates 1, except at their ends, from which construction it follows that the friction between the parts is materially reduced and that the liability of breakage is greatly lessened.

Having thus fully described my invention, I claim as new and desire to secure by Letters Patent—

1. In an elliptic spring, the combination, with inner plates, of outer plates formed with inturned ends which rest upon the inner plates, sockets by which the plates are united, and spacing-leaves interposed between the plates, substantially as described.

2. In an elliptic spring, the combination, with inner plates formed with curved ends 2, of outer plates formed with inturned ends which rest against the inner plates, spacing-leaves held between the outer and the inner plates, a disk formed with a tube-like flange in which the bent ends of the inner plates rest, a second disk formed with a groove in which the tube-like flange fits, and a bolt by which the disks are united, said bolt passing between the bent ends of the inner plates, substantially as described.

JAMES R. FLETCHER.

Witnesses:
LOUIS SLIMMER,
C. G. SCHELLENGER.